United States Patent
Lu et al.

(10) Patent No.: US 12,522,712 B2
(45) Date of Patent: Jan. 13, 2026

(54) SILICONE RUBBER WITH ULTRAVIOLET AGING RESISTANCE AND LOW WATER ABSORPTION, AND PREPARATION METHOD AND APPLICATION THEREOF

(71) Applicant: Hunan Xiangdian Experimental Research Technology Co., Ltd, Changsha (CN)

(72) Inventors: Jiazheng Lu, Changsha (CN); Kai Ning, Changsha (CN); Bowen Wang, Changsha (CN); Pengkang Xie, Changsha (CN); Zhenglong Jiang, Changsha (CN); Bo Li, Changsha (CN); Jianping Hu, Changsha (CN); Zhiyao Fu, Changsha (CN); Zemin Liao, Changsha (CN); Xiang Zhou, Changsha (CN)

(73) Assignee: Hunan Xiangdian Experimental Research Technology Co., Ltd, Changsha (CN)

( * ) Notice: Subject to any disclaimer, the term of this patent is extended or adjusted under 35 U.S.C. 154(b) by 0 days.

(21) Appl. No.: 19/036,122

(22) Filed: Jan. 24, 2025

(65) Prior Publication Data

US 2025/0250410 A1    Aug. 7, 2025

(30) Foreign Application Priority Data

Feb. 1, 2024   (CN) .......................... 202410142730.9

(51) Int. Cl.
*C08K 3/22*    (2006.01)
*C08J 3/24*    (2006.01)

(52) U.S. Cl.
CPC .................. *C08K 3/22* (2013.01); *C08J 3/24* (2013.01); *C08J 2383/04* (2013.01); *C08K 2003/2227* (2013.01); *C08K 2003/2241* (2013.01); *C08K 2003/2296* (2013.01); *C08K 2201/003* (2013.01); *C08K 2201/005* (2013.01); *C08K 2201/014* (2013.01)

(58) Field of Classification Search
None
See application file for complete search history.

(56) References Cited

FOREIGN PATENT DOCUMENTS

CN    116694084 A    9/2023

OTHER PUBLICATIONS

CNIPA, Notification of First Office Action for CN202410142730.9, Mar. 19, 2024.
State Grid Hunan Electric Power Co., Ltd. Xiangtan Power Supply Branch, Hunan Disaster Prevention Technology Co., Ltd., State Grid Hunan Electric Power Co., Ltd. Disaster Prevention and Reduction Center, and Hunan Xiangdian Experimental Research Technology Co., Ltd (Applicants), Replacement claims (allowed) of CN202410142730.9, Apr. 30, 2024.
CNIPA, Notification to grant patent right for invention in CN202410142730.9, May 11, 2024.

*Primary Examiner* — Robert T Butcher
(74) *Attorney, Agent, or Firm* — Zhigang Ma

(57) ABSTRACT

A silicone rubber with UV aging resistance and low water absorption and its preparation method and application are provided. The preparation method uses a coupling agent KH570 and glyceryl monostearate to perform modified treatment on titanium dioxide to obtain modified titanium dioxide, uses a surface-modified coupling agent A171 and glyceryl monostearate to perform modified treatment on fumed silica to obtain modified fumed silica, and further performs subsequent treatment on methyl vinyl siloxane raw rubber, silicone oil, aluminum hydroxide, the modified fumed silica, the modified titanium dioxide, zinc oxide, α-alumina, a coupling agent KH560, a defoamer, iron oxide and a vulcanizing agent to obtain the silicone rubber. The silicone rubber prepared by the preparation method has low water absorption and excellent aging resistance, and its mechanical and electrical properties are also superior.

4 Claims, 1 Drawing Sheet

SILICONE RUBBER WITH ULTRAVIOLET AGING RESISTANCE AND LOW WATER ABSORPTION, AND PREPARATION METHOD AND APPLICATION THEREOF

CROSS-REFERENCE TO RELATED APPLICATION

This application claims priority to Chinese Patent Application No. 202410142730.9, filed on Feb. 1, 2024, which is herein incorporated by reference in its entirety.

TECHNICAL FIELD

The disclosure relates to the field of silicone rubber technologies, and more particularly to a silicone rubber with ultraviolet (UV) aging resistance and low water absorption, and a preparation method and an application thereof.

BACKGROUND

Silicone rubber materials have advantages of good resistance to high and low temperatures, ozone and mold, and are widely used in the manufacture of composite insulators and composite jackets for electrical equipment.

Composite insulator silicone rubber sheds are susceptible to effects of UV light. The UV light is a continuous aging factor that persists from the time a composite insulator is put into service until it is replaced. Long-term outdoor exposure leads to aging phenomena such as filler exudation and surface powdering, resulting in the loss of pollution flashover prevention capability. At the same time, silicone rubber is prone to photo-oxidative degradation under the UV light, causing the silicone rubber molecular chain to break, including the breaking of side chains such as silicone-carbon (Si—C) and carbon-hydrogen (C—H) bonds. With the breaking of the silicone rubber molecular chain, moisture can further invade an insulator core, thereby increasing a dielectric loss, leading to heating at a high-voltage end of the composite insulator and brittleness of the insulator core, which seriously affects a service life of the composite insulator. The average service life of composite insulators is only about 10-12 years, much lower than that of porcelain and glass insulators. Therefore, improving the UV resistance of the silicone rubber and reducing water absorption of the silicone rubber can help extend the service life of the composite insulator.

A Chinese patent literature with publication No. CN116694084A discloses an anti-UV aging silicone rubber composition, silicone rubber, and its preparation method and application. The silicone rubber obtained by this technical solution has good UV resistance. However, this type of silicone rubber is prone to aging in high-humidity and high-temperature environments. This is mainly because the silicone rubber adsorbs moisture in the environment. After absorbing moisture, dielectric parameters of the silicone rubber increase, leading to severe heating of the composite insulator under high electric fields. Under high temperature, the silicone rubber further ages, ultimately resulting in a further decrease in the service life of the silicone rubber.

SUMMARY

A first purpose of the disclosure is to overcome technical problems of high water absorption and poor UV aging resistance in silicone rubbers in the related art.

A second purpose of the disclosure is to provide a silicone rubber and its preparation method that possess superior mechanical properties, resistance to tracking, low water absorption, and UV aging resistance.

In order to achieve above purposes, in a first aspect, the disclosure provides a preparation method of a silicone rubber with UV aging resistance and low water absorption. The preparation method includes the following step S1-S4:

S1, under potential of hydrogen (pH) in a range of 5-6, mixing a titanium dioxide solution and 3-(trimethoxysilyl) propyl methacrylate (also referred to as a coupling agent KH570) to obtain a first mixture, performing a first reflux heating treatment on the first mixture to obtain intermediate modified titanium dioxide, and performing a first contact treatment on the intermediate modified titanium dioxide and glyceryl monostearate at a temperature in a range of 35-45 degrees Celsius (C) for 3-5 hours (h) to obtain modified titanium dioxide; where a concentration of the titanium dioxide solution is in a range of 40-60 grams per liter (g/L); and under pH in a range of 4.5-5.5, mixing a fumed silica solution and vinyltrimethoxysilane (also referred to as a surface-modified coupling agent A171) to obtain a second mixture, performing a second reflux heating treatment on the second mixture to obtain intermediate modified fumed silica, and performing a second contact treatment on the intermediate modified fumed silica and glyceryl monostearate to obtain modified fumed silica;

S2, kneading methyl vinyl siloxane raw rubber, silicone oil, aluminum hydroxide and the modified fumed silica to obtain a first raw rubber;

S3, internally mixing the first raw rubber, the modified titanium dioxide, zinc oxide, α-alumina, 3-glycidoxypropyltrimethoxysilane (also referred to as a coupling agent KH560), a defoamer, and iron oxide to obtain a pre-vulcanized silicone rubber; and S4, vulcanizing the pre-vulcanized silicone rubber with a vulcanizing agent to obtain the silicone rubber with UV aging resistance and low water absorption.

In a second aspect, the disclosure provides the silicone rubber with UV aging resistance and low water absorption obtained by the preparation method provided in the first aspect.

In a third aspect, the disclosure provides an application of the silicone rubber in the second aspect in preparing a composite insulator and/or a composite jacket for electrical equipment.

The silicone rubber prepared by the preparation method provided in the disclosure exhibits excellent overall performance, with good surface integrity, high heat-resistance, strong stability, and superior mechanical properties and also demonstrates significant advantages in terms of UV aging resistance and the change rate of 96 h water absorption.

The silicone rubber composition and the silicone rubber prepared by the preparation method provided in the disclosure, when used for the manufacture of the composite insulator or the composite jacket for electrical equipment, can significantly enhance performance of the composite insulator and the composite jacket for electrical equipment, such as the mechanical and electrical properties. The composite insulator and the composite jacket made from the silicone rubber possess strong stability, excellent flame retardancy, low water absorption, and superior UV aging resistance, and have a long service life and high economic benefits.

DETAILED DESCRIPTION OF EMBODIMENTS

Figure 1:
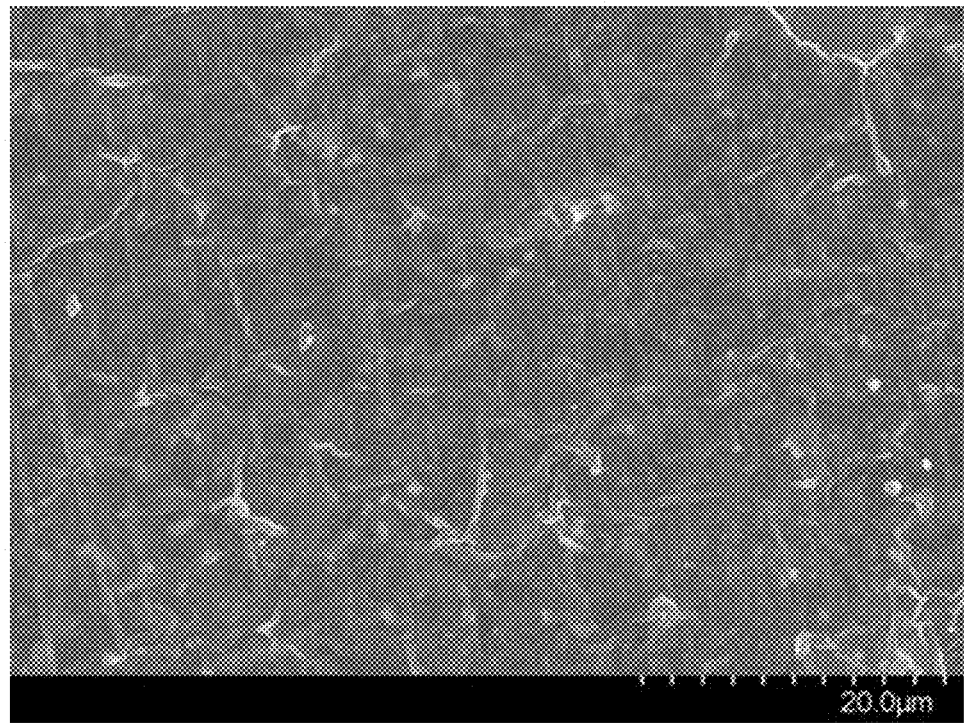
FIG. 1 illustrates a scanning electron microscopy (SEM) image of a surface microstructure of a silicone rubber L1 provided in an embodiment 1 of the disclosure.

Endpoints and any values disclosed herein are not limited to an exact range or value, and these ranges or values should be understood as including values close to these ranges or values. For numerical ranges, the endpoint values of each range, the endpoint values of each range and individual point values, and individual point values can be combined with each other to obtain one or more new numerical ranges, which should be considered as specifically disclosed herein.

In a first aspect, the disclosure provides a preparation method of a silicone rubber with ultraviolet (UV) aging resistance and low water absorption, including the following steps S1-S4.
- S1, under pH in a range of 5-6, a titanium dioxide solution is mixed with a coupling agent KH570 to obtain a first mixture, a first reflux heating treatment is performed on the first mixture to obtain intermediate modified titanium dioxide, and a first contact treatment is performed on the intermediate modified titanium dioxide and glyceryl monostearate at a temperature in a range of 35-45° C. for 3-5 h to obtain modified titanium dioxide; and a concentration of the titanium dioxide solution is in a range of 40-60 g/L; and
under pH in a range of 4.5-5.5, a fumed silica solution is mixed with a surface-modified coupling agent A171 to obtain a second mixture, a second reflux heating treatment is performed on the second mixture to obtain intermediate modified fumed silica, and a second contact treatment is performed on the intermediate modified fumed silica and glyceryl monostearate to obtain modified fumed silica.
- S2, methyl vinyl siloxane raw rubber, silicone oil, aluminum hydroxide and the modified fumed silica are kneaded to obtain a first raw rubber.
- S3, the first raw rubber, the modified titanium dioxide, zinc oxide, α-alumina, a coupling agent KH560, a defoamer, and iron oxide are internally mixed to obtain a pre-vulcanized silicone rubber.
- S4, the pre-vulcanized silicone rubber is vulcanized with a vulcanizing agent to obtain the silicone rubber with UV aging resistance and low water absorption.

It should be noted that, in the disclosure, the titanium dioxide solution is a solution or suspension obtained by mixing titanium dioxide with absolute ethanol, and the fumed silica solution is a solution or suspension obtained by mixing fumed silica with absolute ethanol.

In an embodiment, an average particle diameter of the titanium dioxide is no more than 80 nanometers (nm), and a specific surface area of the fumed silica is in a range of 180-250 square meters per gram ($m^2$/g).

It should be noted that, the disclosure has no special requirements for a pH adjuster used in the step S1, as long as the pH adjuster can adjust the pH of the titanium dioxide solution and the fumed silica solution to the required range of the disclosure. For example, the pH adjuster is 0.1 moles per liter (mol/L) dilute hydrochloric acid.

In an embodiment, in the step S1, the first reflux heating treatment is performed by water bath heating, a temperature of the water bath heating is in a range of 80-90° C., and a period for the water bath heating is in a range of 3-5 h.

In an embodiment, in a preparation process of the modified titanium dioxide, a weight ratio of the glyceryl monostearate for the first contact treatment to the coupling agent KH570 to the titanium dioxide in the titanium dioxide solution is in a range of 0.15-0.23:0.5-1.5:1. Under these conditions, the obtained silicone rubber exhibits superior UV aging resistance and lower water absorption.

In an embodiment, in the step S1, a concentration of the fumed silica solution is in a range of 40-60 g/L.

In an embodiment, in the step S1, the second reflux heating treatment is performed by water bath heating, a temperature of the water bath heating is in a range of 80-90° C. and a period for the water bath heating is in a range of 3-5 h.

In an embodiment, in the step S1, a temperature of the second contact treatment is in a range of 20-35° C. and a period for the second contact treatment is in a range of 3-5 h.

In an embodiment, in a preparation process of the modified fumed silica, a weight ratio of the glyceryl monostearate for the second contact treatment to the surface-modified coupling agent A171 to fumed silica in the fumed silica solution is in a range of 0.05-0.15:0.04-0.1:1. Under these conditions, the obtained silicone rubber exhibits superior UV aging resistance and lower water absorption.

In an embodiment, the step S1 further includes: the first contact treatment is performed on the intermediate modified titanium dioxide with the glyceryl monostearate to obtain a first intermediate material, and a first filtration, a first extraction with absolute ethanol, and first drying are performed sequentially on the first intermediate material to obtain the modified titanium dioxide.

Furthermore, a filtration pore size of the first filtration is no more than 80 nm, a period for the first extraction with the absolute ethanol is in a range of 5-7 h, a temperature of the first drying is in a range of 90-110° C., and a period for the first drying is in a range of 10-14 h.

In an embodiment, the step S1 further includes: the second contact treatment is performed on the intermediate modified fumed silica with the glyceryl monostearate to obtain a second intermediate material, and a second filtration, a second extraction with absolute ethanol, and second drying are performed sequentially on the second intermediate material to obtain the modified fumed silica.

Furthermore, a filtration pore size of the second filtration is no more than 80 nm, a period for the second extraction with the absolute ethanol is in a range of 5-7 h, a temperature of the second drying is in a range of 90-110° C., and a period for the second drying is in a range of 10-14 h.

In an embodiment, in the steps S2-S4, when an amount of the methyl vinyl siloxane raw rubber is 100 parts by weight, an amount of the modified titanium dioxide is in a range of 2.5-7.5 parts by weight, an amount of the zinc oxide is in a range of 3.5-8.5 parts by weight, an amount of the modified fumed silica is in a range of 31-53 parts by weight, an amount of the aluminum hydroxide is in a range of 90-120 parts by weight, an amount of the α-alumina is in a range of 3.5-8.5 parts by weight, an amount of the silicone oil is in a range of 5-12 parts by weight, an amount of the coupling agent KH560 is in a range of 13.5-30 parts by weight, an amount of the vulcanizing agent is in a range of 0.5-1.0 parts by weight, an amount of the defoamer is in a range of 0.2-0.5 parts by weight, and an amount of the iron oxide is in a range of 1.5-2.5 parts by weight.

In an embodiment, a molecular weight of the methyl vinyl siloxane raw rubber is in a range of 600,000-700,000, and a vinyl content in the methyl vinyl siloxane raw rubber, expressed as a weight fraction, is 0.15-0.20 weight percentages (wt %).

In an embodiment, an average particle diameter of the zinc oxide is no more than 80 nm, an average particle diameter of the aluminum hydroxide is in a range of 2.6-4.0 micrometers (μm), an average particle diameter of the α-alumina is no more than 50 μm, and an average particle diameter of the iron oxide is in a range of 50-150 μm.

In an embodiment, the silicone oil includes one or more selected from the group consisting of hydrogen silicone oil, methyl silicone oil and hydroxy silicone oil.

In an embodiment, the vulcanizing agent is 1,1-di-(tert-butylperoxy)-3,3,5-trimethylcyclohexane.

In an embodiment, the defoamer is trolamine.

In an embodiment, in the step S2, kneading operations include the following steps: first kneading is performed on a part of the methyl vinyl siloxane raw rubber, a part of the silicone oil, and the aluminum hydroxide to obtain a flame retardant raw rubber;
  second kneading is performed on a remaining part of the methyl vinyl siloxane raw rubber, a remaining part of the silicone oil, and the modified fumed silica to obtain a reinforcing raw rubber; and
  the flame retardant raw rubber and the reinforcing raw rubber are combined to obtain the first raw rubber.

In an embodiment, a weight ratio of the part of the methyl vinyl siloxane raw rubber to the remaining part of the methyl vinyl siloxane raw rubber is in a range of 1:0.5-0.9, and a weight ratio of the part of the silicone oil to the remaining part of the silicone oil is in a range of 1:2.5-9.

In an embodiment, in the step S2, a temperature of the first kneading is in a range of 140-160° C., a period for the first kneading is in a range of 0.5-2 h, a temperature of the second kneading is in a range of 140-160° C., and a period for the second kneading is in a range of 1-2 h.

In an embodiment, in the step S3, a temperature of the internally mixing process is in a range of 140-160° C., a vacuum degree is in a range of 0.07-0.1 megapascals (MPa), and a period for the internally mixing process is in a range of 30-90 minutes (min).

In an embodiment, in the step S4, a temperature of the vulcanizing process is in a range of 140-160° C., and a period for the vulcanizing process is in a range of 10-30 min.

In a second aspect, the disclosure provides the silicone rubber with UV aging resistance and low water absorption obtained by the preparation method provided in the first aspect of the disclosure.

In a third aspect, the disclosure provides an application of the silicone rubber provided in the second aspect in preparing a composite insulator and/or a composite jacket for electrical equipment.

A detailed description of the disclosure is provided below through illustrative embodiments. In these illustrative embodiments, unless otherwise specified, all raw materials used are commercially available products.

The titanium dioxide: grade FR-767, purchased from Zhejiang Fangyuan Titanium Industry Co., Ltd., China, rutile type, with a purity of 95.0 wt %, and an average particle diameter of 50 nm.

The titanium dioxide solution: 50 g/L, prepared by mixing the titanium dioxide (grade FR-767, purchased from Zhejiang Fangyuan Titanium Industry Co., Ltd., rutile type, a purity of 95.0 wt %, an average particle diameter of 50 nm) with absolute ethanol.

The coupling agent KH570: purchased from Jiangxi Chenguang New Materials Co., Ltd.

The coupling agent KH560: purchased from Jiangxi Chenguang New Materials Co., Ltd.

The glyceryl monostearate: purchased from Tianjin Huasheng Chemical Reagent Co., Ltd.

The fumed silica: grade HS-200, purchased from Hoshine Silicon Industry Co., Ltd., and with a specific surface area of 200 m²/g.

The fumed silica solution: 50 g/L, prepared by mixing the fumed silica (grade HS-200, purchased from Hoshine Silicon Industry Co., Ltd., with a specific surface area 200 m²/g) with absolute ethanol.

The surface-modified coupling agent A171: purchased from Shandong Shuntai New Materials Technology Co., Ltd.

Triethoxyvinylsilane also referred to as a surface-modified coupling agent A151: purchased from Shandong Shuntai New Materials Technology Co., Ltd.

The methyl vinyl siloxane raw rubber: grade GX-172, purchased from Anhui Guibao Organic Silicon New Materials Co., Ltd. (GBXF Silicones Co., Ltd.), with a molecular weight of 660,000, and a vinyl content of 0.16 wt %.

The silicone oil: composed of the hydrogen silicone oil, the methyl silicone oil, and the hydroxyl silicone oil in a weight ratio of 1:2:15; the hydrogen silicone oil is with a grade QL-202, purchased from Jiangsu Quanli Chemical Co., Ltd., and with a hydrogen content of 1-1.6 wt %, the methyl silicone oil is with a grade QL-201, purchased from Jiangsu Quanli Chemical Co., Ltd., and with a methyl content of 98-99 wt %, and the hydroxyl silicone oil is with a grade QL-203D, purchased from Jiangsu Quanli Chemical Co., Ltd., and with a hydroxyl content of 4-5 wt %.

The aluminum hydroxide: a purity of 99.9 wt %, and an average particle diameter of 3.0 μm.

The zinc oxide: grade HN-J30, purchased from Hangzhou Hengna New Materials Co., Ltd., with a purity of 99.0 wt %, and an average particle diameter of 30 nm.

The α-Alumina: grade A-C-30, purchased from China Aluminum Shandong Co., Ltd. (CHALCO Shandong Co., Ltd), with a purity of 99.0 wt %, and an average particle diameter of 3.0 μm.

The defoamer: triethanolamine, purchased from Jianglong Chemical Technology Co., Ltd.

The iron oxide: a purity of 86.0 wt %, an average particle diameter of 100 μm, and purchased from Shanghai Yipin Pigment Co., Ltd.

The vulcanizing agent: 1,1-di-(tert-butylperoxy)-3,3,5-trimethylcyclohexane (TMCH), purchased from Jiangsu Qiangsheng Functional Chemical Co., Ltd.

Embodiment 1

S1, under pH of 5.5, a titanium dioxide solution is mixed with a coupling agent KH570 to obtain a first mixture, a first reflux heating treatment is performed on the first mixture to obtain intermediate modified titanium dioxide, and a first contact treatment is performed on the intermediate modified titanium dioxide and glyceryl monostearate to obtain a first intermediate material, and a first filtration, a first extraction with absolute ethanol, and first drying are sequentially performed on the first intermediate material to obtain modified titanium dioxide; and under pH of 5, a fumed silica solution is mixed with a surface-modified coupling agent A171 to obtain a second mixture, a second reflux heating treatment is performed on the second mixture to obtain intermediate modified fumed silica, and a second contact treatment is performed on the intermediate modified fumed silica and glyceryl monostearate to obtain a second intermediate material, and a second filtration, a second extraction with absolute ethanol and second drying are sequentially performed on the second intermediate material to obtain modified fumed silica.

The first reflux heating treatment and the second reflux heating treatment are performed by water bath heating, a temperature of the water bath heating for each reflux heating treatment is 85° C., and a period for the water bath heating for each reflux heating treatment is 4 h.

A temperature of the first contact treatment is 40° C., a period for the first contact treatment is 4 h, a temperature of the second contact treatment is 30° C., and a period for the second contact treatment is 4 h.

A filtration pore size of each of the first filtration and the second filtration is 80 nm, a period for each of the first extraction with the absolute ethanol and the second extraction with the absolute ethanol is 6 h, a temperature of each of the first drying and the second drying is 100° C., and a period for each of the first drying and the second drying is 12 h.

S2, methyl vinyl siloxane raw rubber, silicone oil, aluminum hydroxide and the modified fumed silica are kneaded to obtain a first raw rubber.

S3, the first raw rubber, the modified titanium dioxide, zinc oxide, α-alumina, a coupling agent KH560, a defoamer, and iron oxide are internally mixed to obtain a pre-vulcanized silicone rubber.

S4, the pre-vulcanized silicone rubber is vulcanized with a vulcanizing agent to obtain a silicone rubber L1 with UV aging resistance and low water absorption.

In the step S1, in a preparation process of the modified titanium dioxide, a weight ratio of the glyceryl monostearate for the first contact treatment to the coupling agent KH570 to a dry weight of titanium dioxide in the titanium dioxide solution is 0.2:0.1:1. The dry weight of the titanium dioxide is 1.5 kilograms (kg). In a preparation process of the modified fumed silica, a weight ratio of the glyceryl monostearate for the second contact treatment to the surface-modified coupling agent A171 to a dry weight of fumed silica in the fumed silica solution is 0.1:0.08:1. The dry weight of the fumed silica is 14 kg.

In the step S2, kneading operations include the following steps: first kneading is performed on a part of the methyl vinyl siloxane raw rubber, a part of the silicone oil, and the aluminum hydroxide to obtain a flame retardant raw rubber;
second kneading is performed on a remaining part of the methyl vinyl siloxane raw rubber, a remaining part of the silicone oil, and the modified fumed silica to obtain a reinforcing raw rubber; and
the flame retardant raw rubber and the reinforcing raw rubber are combined to obtain the first raw rubber.

A weight ratio of the part of the methyl vinyl siloxane raw rubber to the remaining part of the methyl vinyl siloxane raw rubber is 3:2, and a weight ratio of the part of the silicone oil to the remaining part of the silicone oil is 1:5.

In the steps S2-S4, when an amount of the methyl vinyl siloxane raw rubber is 100 parts by weight, an amount of the modified titanium dioxide is 4.5 parts by weight, an amount of the zinc oxide is 6 parts by weight, an amount of the modified fumed silica is 40 parts by weight, an amount of the aluminum hydroxide is 110 parts by weight, an amount of the α-alumina is 5 parts by weight, an amount of the silicone oil is 8 parts by weight, an amount of the coupling agent KH560 is 25 parts by weight, an amount of the vulcanizing agent is 0.8 parts by weight, an amount of the defoamer is 0.4 parts by weight, and an amount of the iron oxide is 2.2 parts by weight. A total weight of the methyl vinyl siloxane raw rubber, the silicone oil, the aluminum hydroxide, the modified fumed silica, the modified titanium dioxide, the zinc oxide, the α-alumina, the coupling agent KH560, the defoamer, the iron oxide and the vulcanizing agent is 15 kg.

A SEM image of a surface microstructure of the silicone rubber L1 is shown as FIG. 1.

Embodiment 2

The process is performed in the same manner as in the embodiment 1, with the exception that in the step S1, the pH of the titanium dioxide solution used for the first reflux heating treatment is adjusted to 6, and the pH of the fumed silica solution used for the second reflux heating treatment is adjusted to 5.5.

All other steps and parameters are the same as in the embodiment 1 to obtain a silicone rubber L2 with UV aging resistance and low water absorption.

Embodiment 3

The process is performed in the same manner as in the embodiment 1, with the exception that in the step S1, in a preparation process of the modified titanium dioxide, a weight ratio of the glyceryl monostearate for the first contact treatment to the coupling agent KH570 to titanium dioxide in the titanium dioxide solution is 0.25:1.8:1.

All other steps and parameters are the same as in the embodiment 1 to obtain a silicone rubber L3 with UV aging resistance and low water absorption.

Embodiment 4

The process is performed in the same manner as in the embodiment 1, with the exception that in the step S1, in a preparation process of the modified fumed silica, a weight ratio of the glyceryl monostearate for the second contact treatment to the surface-modified coupling agent A171 to fumed silica in the fumed silica solution is 0.2:0.2:1.

All other steps and parameters are the same as in the embodiment 1 to obtain a silicone rubber L4 with UV aging resistance and low water absorption.

Comparative Embodiment 1

The process is performed in the same manner as in the embodiment 1, with the exception that in the step S1, the coupling agent KH570 used to prepare the modified titanium dioxide is replaced with a same weight of a coupling agent KH560.

All other steps and parameters are the same as in the embodiment 1 to obtain a silicone rubber DL1.

Comparative Embodiment 2

The process is performed in the same manner as in the embodiment 1, with the exception that in the step S1, the surface-modified coupling agent A171 used to prepare the modified fumed silica is replaced with a same weight of a surface-modified coupling agent A151.

All other steps and parameters are the same as in the embodiment 1 to obtain a silicone rubber DL2.

Comparative Embodiment 3

The process is performed in the same manner as in the embodiment 1, with the exception that the glyceryl monostearate is not used to perform the first contact treatment on the intermediate modified titanium dioxide, and not used to perform the second contact treatment on the intermediate modified fumed silica, and specific steps are as follows.
- S1, under pH of 5.5, a titanium dioxide solution is mixed with a coupling agent KH570 followed by performing a first reflux heating treatment to obtain intermediate modified titanium dioxide, and a first filtration, a first extraction with absolute ethanol, and first drying are sequentially performed on the intermediate modified titanium dioxide to obtain modified titanium dioxide; and
  under pH of 5, a fumed silica solution is mixed with a surface-modified coupling agent A171 followed by performing a second reflux heating treatment to obtain intermediate modified fumed silica, and a second filtration, a second extraction with absolute ethanol and second drying are sequentially performed on the intermediate modified fumed silica to obtain modified fumed silica.

The first reflux heating treatment and the second reflux heating treatment are performed by water bath heating, a temperature of the water bath heating of each reflux heating treatment is 85° C., and a period for the water bath heating of each reflux heating treatment is 4 h.

A filtration pore size of each of the first filtration and the second filtration is 80 nm, a period for each of the first extraction with the absolute ethanol and the second extraction with the absolute ethanol is 6 h, a temperature of each of the first drying and the second drying is 100° C., and a period for each of the first drying and the second drying is 12 h.
- S2, methyl vinyl siloxane raw rubber, silicone oil, aluminum hydroxide and the modified fumed silica are kneaded to obtain a first raw rubber.
- S3, the first raw rubber, the modified titanium dioxide, zinc oxide, α-alumina, a coupling agent KH560, a defoamer, and iron oxide are internally mixed to obtain a pre-vulcanized silicone rubber.
- S4, the pre-vulcanized silicone rubber is vulcanized with a vulcanizing agent to obtain a silicone rubber DL3.

All other steps and parameters are the same as in the embodiment 1.

Figure 2:
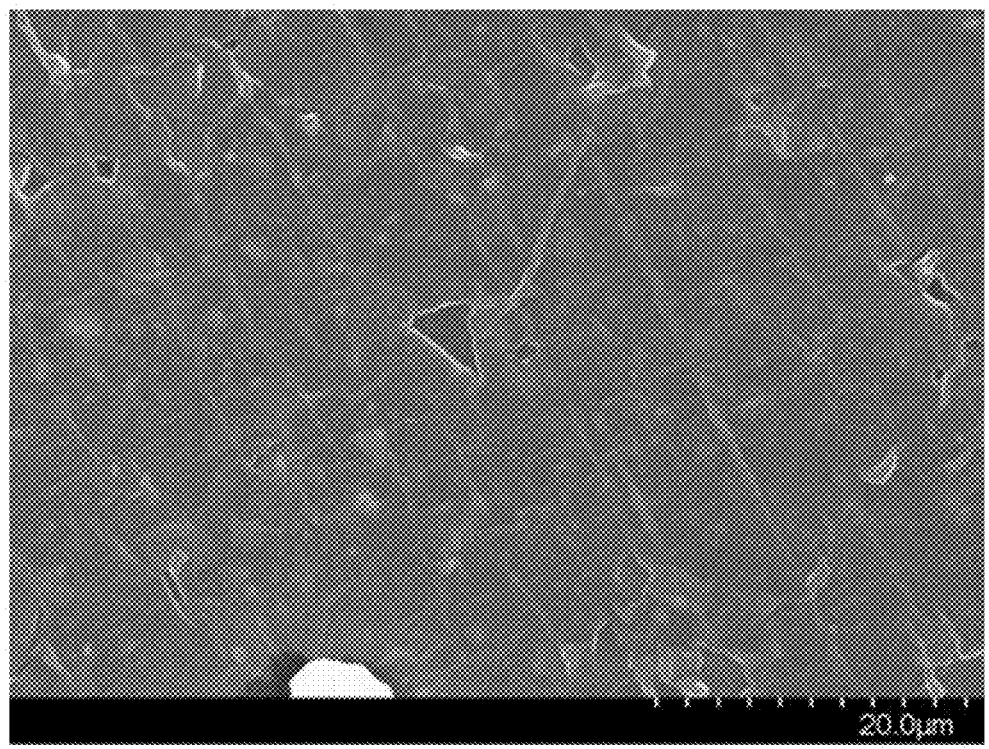
FIG. 2 illustrates an SEM image of a surface microstructure of a silicone rubber DL3 provided in a comparative embodiment 3 of the disclosure.

A SEM image of a surface microstructure of the silicone rubber DL3 is shown in FIG. 2. It can be seen from FIG. 2 that the uniformity and compactness of the surface particle distribution of the silicone rubber DL3 are inferior to those of the silicone rubber L1 prepared in the embodiment 1.

Comparative Embodiment 4

The process is performed in the same manner as in the embodiment 1, with the exception that in the step S1, the pH of the titanium dioxide solution used for the first reflux heating treatment is adjusted to 7, and the pH of the fumed silica solution used for the second reflux heating treatment is adjusted to 7.

All other steps and parameters are the same as in the embodiment 1 to obtain a silicone rubber DL4.

Comparative Embodiment 5

The process is performed in the same manner as in an embodiment 1 of a Chinese patent with publication No. CN116694084A to obtain a silicone rubber DL5.

Test Example 1

The silicone rubbers obtained from the embodiments and comparative embodiments are cut into samples with a dimension of 14 millimeters (mm)×12 mm×2 mm each. The samples are then tested for relevant properties according to the methods specified in the industry standard "DL/T376-2019 General Technical Conditions for Insulating Materials Used in Sheds and Sheaths of Polymer Insulators". The test results are shown in Table 1.

Test Example 2

The silicone rubbers obtained from the embodiments and comparative embodiments are cut into samples with a dimension of 14 mm×12 mm×2 mm each. The samples are then subjected to UV aging treatment under conditions of 50° C. temperature and a 313UVB irradiation intensity of 0.79 watts per square meter (W/m$^2$). The UV aging treatment lasts for 500 h. After the UV aging treatment, the properties of the silicone rubber samples are tested using the methods described in the test example 1, and the test results are shown in the Table 1.

TABLE 1 test results.

| | | Tensile Strength (MPa) | Breaking Elongation (%) | Tear Strength (kN/m) | Breakdown Strength (kV/mm) | Tracking Resistance (mm) | Static Contact Angle (°) | 96 h Water Absorption (%) |
|---|---|---|---|---|---|---|---|---|
| L1 | Before aging | 5.3 | 471 | 21.4 | 25.6 | 0.8 | 115 | 0.22 |
| | After aging | 5.2 | 460 | 20.6 | 24.3 | 0.9 | 111 | 0.25 |
| | Change rate | −1.89% | −2.34% | −3.74% | −5.08% | 12.50% | −3.48% | 13.64% |
| L2 | Before aging | 5.2 | 465 | 21.9 | 24.3 | 1 | 109 | 0.23 |
| | After aging | 5.1 | 453 | 21.1 | 23 | 1.1 | 105 | 0.27 |
| | Change rate | −1.92% | −2.58% | −3.65% | −5.35% | 10.00% | −3.67% | 17.39% |

TABLE 1-continued test results.

| | | Tensile Strength (MPa) | Breaking Elongation (%) | Tear Strength (kN/m) | Breakdown Strength (kV/mm) | Tracking Resistance (mm) | Static Contact Angle (°) | 96 h Water Absorption (%) |
|---|---|---|---|---|---|---|---|---|
| L3 | Before aging | 5.2 | 481 | 21.5 | 25.4 | 0.8 | 114 | 0.28 |
| | After aging | 5 | 465 | 20.6 | 23.7 | 1 | 108 | 0.32 |
| | Change rate | −3.85% | −3.33% | −4.19% | −6.69% | 25.00% | −5.26% | 14.29% |
| L4 | Before aging | 5.2 | 477 | 21.3 | 24.9 | 0.9 | 114 | 0.31 |
| | After aging | 5.1 | 467 | 20.5 | 23.5 | 1 | 110 | 0.38 |
| | Change rate | −1.92% | −2.10% | −3.76% | −5.62% | 11.11% | −3.51% | 22.58% |
| DL1 | Before aging | 5.3 | 478 | 22 | 24.6 | 1.1 | 112 | 0.31 |
| | After aging | 5.1 | 459 | 20.8 | 22.8 | 1.4 | 105 | 0.36 |
| | Change rate | −3.77% | −3.97% | −5.45% | −7.32% | 27.27% | −6.25% | 16.13% |
| DL2 | Before aging | 5 | 480 | 21.8 | 24.4 | 0.8 | 111 | 0.35 |
| | After aging | 4.9 | 468 | 20.9 | 23.1 | 0.9 | 107 | 0.41 |
| | Change rate | −2.00% | −2.50% | −4.13% | −5.33% | 12.50% | −3.60% | 17.14% |
| DL3 | Before aging | 5.1 | 472 | 21.3 | 24.9 | 0.9 | 114 | 0.33 |
| | After aging | 4.8 | 453 | 20.3 | 23.1 | 1.2 | 108 | 0.42 |
| | Change rate | −5.88% | −4.03% | −4.69% | −7.23% | 33.33% | −5.26% | 27.27% |
| DL4 | Before aging | 5.1 | 477 | 21.3 | 23.9 | 0.7 | 115 | 0.34 |
| | After aging | 4.8 | 456 | 20.2 | 22.1 | 0.9 | 109 | 0.45 |
| | Change rate | −5.88% | −4.40% | −5.16% | −7.53% | 28.57% | −5.22% | 32.35% |
| DL5 | Before aging | 5.2 | 470 | 17.8 | 26.5 | 1 | 109 | 0.45 |
| | After aging | 5.1 | 459 | 17 | 24.5 | 1.2 | 105 | 0.66 |
| | Change rate | −1.92% | −2.34% | −4.49% | −7.55% | 20.00% | −3.67% | 46.67% |

Through the above comparisons, it is apparent that the preparation method provided by the disclosure can produce the silicone rubber with high surface integrity, strong stability, superior mechanical properties, excellent UV aging resistance, and low water absorption. Composite insulators or composite jackets for electrical equipment made from the silicone rubber material exhibit stronger stability, better flame retardancy, lower water absorption, and superior UV aging resistance, and have a long service life and high economic benefits.

Furthermore, in the preparation process of the modified titanium dioxide, a weight ratio of the glyceryl monostearate for the first contact treatment to the coupling agent KH570 to the titanium dioxide in the titanium dioxide solution is in a range of 0.15-0.23:0.5-1.5:1. In the preparation process of the modified fumed silica, a weight ratio of the glyceryl monostearate for the second contact treatment to the surface-modified coupling agent A171 to fumed silica in the fumed silica solution is in a range of 0.05-0.15:0.04-0.1:1. As can be seen from the Table 1, the silicone rubber obtained under these conditions exhibits lower water absorption, with the 96-hour water absorption before aging not exceeding 0.25% and the 96-hour water absorption after aging not exceeding 0.3%. The UV aging resistance is also superior.

The illustrative embodiments of the disclosure are described in detail above, but the disclosure is not limited to them. Within the scope of the technical concept of the disclosure, various simple modifications can be made to the technical solution of the disclosure, including the combination of various technical features in any other suitable way. These simple modifications and combinations should also be considered as disclosed content of the disclosure and fall within the scope of protection of the disclosure.

What is claimed is:

1. A preparation method of a silicone rubber with ultraviolet (UV) aging resistance and low water absorption, comprising the following steps:
    S1, under potential of hydrogen (pH) in a range of 5-6, mixing a titanium dioxide solution and 3-(trimethoxysilyl) propyl methacrylate to obtain a first mixture, performing a first reflux heating treatment on the first mixture to obtain intermediate modified titanium dioxide, and performing a first contact treatment on the intermediate modified titanium dioxide and glyceryl monostearate at a temperature in a range of 35-45 degrees Celsius (° C.) for 3-5 hours (h) to obtain modified titanium dioxide; wherein a concentration of the titanium dioxide solution is in a range of 40-60 grams per liter (g/L), a weight ratio of the glyceryl monostearate for the first contact treatment to the 3-(trimethoxysilyl) propyl methacrylate to titanium dioxide in the titanium dioxide solution is in a range of 0.15-0.23:0.5-1.5:1, and an average particle diameter of the titanium dioxide is no more than 80 nanometers (nm); and under pH in a range of 4.5-5.5, mixing a fumed silica solution and vinyltrimethoxysilane to obtain a second mixture, performing a second reflux heating treatment on the second mixture to obtain intermediate modified fumed silica, and performing a second contact treatment on the intermediate modified fumed silica and glyceryl monostearate to obtain modified fumed silica; wherein a weight ratio of the glyceryl monostearate for the second contact treatment to the vinyltrimethoxysilane to fumed silica in the fumed silica solution is in a range of 0.05-0.15:0.04-0.1:1, and a specific surface area of the fumed silica is in a range of 180-250 square meters per gram ($m^2/g$);

S2, kneading methyl vinyl siloxane raw rubber, silicone oil, aluminum hydroxide and the modified fumed silica to obtain a first raw rubber;

S3, internally mixing the first raw rubber, the modified titanium dioxide, zinc oxide, α-alumina, 3-glycidoxypropyltrimethoxysilane, a defoamer, and iron oxide to obtain a pre-vulcanized silicone rubber; and S4, vulcanizing the pre-vulcanized silicone rubber with a vulcanizing agent to obtain the silicone rubber with UV aging resistance and low water absorption;

wherein in the steps S2-S4, when an amount of the methyl vinyl siloxane raw rubber is 100 parts by weight, an amount of the modified titanium dioxide is in a range of 2.5-7.5 parts by weight, an amount of the zinc oxide is in a range of 3.5-8.5 parts by weight, an amount of the modified fumed silica is in a range of 31-53 parts by weight, an amount of the aluminum hydroxide is in a range of 90-120 parts by weight, an amount of the α-alumina is in a range of 3.5-8.5 parts by weight, an amount of the silicone oil is in a range of 5-12 parts by weight, an amount of the 3-glycidoxypropyltrimethoxysilane is in a range of 13.5-30 parts by weight, an amount of the vulcanizing agent is in a range of 0.5-1.0 parts by weight, an amount of the defoamer is in a range of 0.2-0.5 parts by weight, and an amount of the iron oxide is in a range of 1.5-2.5 parts by weight; and wherein an average particle diameter of the zinc oxide is no more than 80 nm, an average particle diameter of the aluminum hydroxide is in a range of 2.6-4.0 micrometers (μm), an average particle diameter of the α-alumina is no more than 50 μm, and an average particle diameter of the iron oxide is in a range of 50-150 μm.

2. The preparation method as claimed in claim 1, wherein in the step S1, a concentration of the fumed silica solution is in a range of 40-60 g/L, and/or in the step S1, a temperature of the second contact treatment is in a range of 20-35° C. and a period for the second contact treatment is in a range of 3-5 h.

3. The preparation method as claimed in claim 1, wherein the step S1 comprises:

performing the first contact treatment on the intermediate modified titanium dioxide and the glyceryl monostearate for the first contact treatment to obtain a first intermediate material, and performing sequentially a first filtration, a first extraction with absolute ethanol, and first drying on the first intermediate material to obtain the modified titanium dioxide; and/or performing the second contact treatment on the intermediate modified fumed silica and the glyceryl monostearate for the second contact treatment to obtain a second intermediate material, and performing sequentially a second filtration, a second extraction with absolute ethanol, and second drying on the second intermediate material to obtain the modified fumed silica.

4. The preparation method as claimed in claim 1, wherein the step S2 comprises:

performing first kneading on a part of the methyl vinyl siloxane raw rubber, a part of the silicone oil, and the aluminum hydroxide to obtain a flame retardant raw rubber;

performing second kneading on a remaining part of the methyl vinyl siloxane raw rubber, a remaining part of the silicone oil, and the modified fumed silica to obtain a reinforcing raw rubber; and combining the flame retardant raw rubber and the reinforcing raw rubber to obtain the first raw rubber.

* * * * *